United States Patent [19]

Utsugi et al.

[11] Patent Number: 5,010,437
[45] Date of Patent: Apr. 23, 1991

[54] RECORDING MEDIUM PLAYER APPARATUS

[75] Inventors: Nobuo Utsugi; Hisashi Kihara; Shuichi Mori; Junichi Fuse; Takashi Miyake; Yoshikatsu Ikata, all of Saitama, Japan

[73] Assignee: Pioneer Electronic Corp., Tokyo, Japan

[21] Appl. No.: 488,826

[22] Filed: Mar. 6, 1990

[30] Foreign Application Priority Data

Jun. 7, 1989 [JP] Japan .................................. 1-144413

[51] Int. Cl.⁵ ........................................... G11B 33/02
[52] U.S. Cl. ................................................. 360/137
[58] Field of Search ...................... 360/137, 96.5, 96.6, 360/99.02, 99.03, 99.06, 99.07; 242/199; 369/75.1

[56] References Cited

U.S. PATENT DOCUMENTS

4,533,966 8/1985 Kume ................................. 360/137
4,764,821 8/1988 Aoki et al. .......................... 360/137

Primary Examiner—Robert S. Tupper
Attorney, Agent, or Firm—Sughrue, Mion, Zinn, Macpeak & Seas

[57] ABSTRACT

A recording medium player apparatus including an open/close body which is disposed so as to openably cover a recording medium insertion slot formed in the front surface portion of a housing. The open/close body has an operation portion for controlling the operation of a play mechanism. The apparatus further includes a support member for pivotally supporting at a free end thereof the open/close body. A spring member constitutes a first driving mechanism for pivoting the support member. The spring member, a gear disposed on the support member, and a pair of fan-like gears which mesh with the gear disposed on the support member constitute a second driving mechanism for pivoting the open/close body relative to the support member in synchronism with the pivotal movement of the support member. This configuration enables the pivotal portion of the open/close body to be disposed at a rear surface portion of the open/close such that the pivotal portion is covered by the front panel portion of the open/close body when the open/close body is in a closed position.

7 Claims, 9 Drawing Sheets

RECORDING MEDIUM PLAYER APPARATUS

BACKGROUND OF THE INVENTION

The present invention relates to a recording medium player apparatus such as a cassette tape recorder, and particularly to a recording medium player apparatus such as a small-sized cassette tape recorder having a recording medium insertion slot.

In the case of a mobile recording medium player apparatus such as a cassette tape recorder and, in particular, a so-called car-stereo apparatus disposed in the vicinity of a driver's seat in the car, the area available as an operation face of the recording medium player apparatus is extremely limited. For example, it is typical to provide not only an insertion slot for inserting a cassette tape as a recording medium, but also an operation control circuit, an indication circuit, etc. on the operation face of the cassette tape recorder body within a small area of, for example, about 18 cm × 5 cm.

A suitable apparatus mounting location where the driver of the vehicle can very easily perform operation of the apparatus is only an extremely limited space, such as a portion of the vehicle dashboard or console. Accordingly, it is required to additionally provide a circuit for operational control of a radio tuning function and for indication thereof within such a limited area of 18 cm × 5 cm as described above.

As one countermeasure for accommodating the various circuits efficiently within such a small area, there is a method in which a dustproof door for covering a cassette tape insertion slot is also used as a dial portion of a radio receiver, for example, as disclosed in Japanese Utility Model Publication No. 43-29326. In this method, wasted space is used effectively where the radio receiver, built-in type car stereo apparatus is only used as a radio receiver. In contrast, where the car-stereo apparatus is used as a recording medium player apparatus, such as a tape recorder, the space cannot be used for disposing circuit elements for display and control because the dustproof door is pushed into the inside of the body when a cassette tape is inserted.

Recently, there has been a strong demand for a high degree of control functions in a recording medium player apparatus such as a tape recorder. That is, various functions such as jump selection to select programs by a particular piece of music, multi-program selection in which a program enables several pieces of music to be selected ahead of time, repeating play of a piece of music, selection of a particular type of tape (normal tape, chromium dioxide tape, metal tape), Dolby change-over (OFF, B-type, C-type), tape running direction change-over (in the case of auto-reverse apparatus), etc., are required in addition to the fundamental control. Fundamental control comprises the tape recorder, including control on PLAY (reproduction), FF (fast feed), REW (rewind), STOP (stoppage), and EJECT (take-out a tape cassette), on/off of power switch, sound volume, sound quality, etc. In addition, taking into consideration the devices for the change-over control of the above functions and for indication of those functions, it is difficult to provide circuits for the display and control functions within such a limited space of about 18 cm × 5 cm. The difficulty is particularly acute in the case where a radio-tuning function, etc., is integrally provided in addition to a tape recorder function such as an audio appliance or in the case where a video function such as a television set, a VTR (video tape recorder), or the like, is provided in addition to such an audio function. In those instances, it is necessary to provide control and indication for the various functions, so that it is impossible to arrange all the devices for those functions within such a small space as described above.

If an indicator for indicating operational information with respect to operations of a playing portion, a tuner, etc., and play information with respect to contents of play, and so on, does not have a relatively large area, then an operator cannot distinguish or recognize the contents of information indicated. It is, however, difficult to increase the area of the indicator when a recording medium insertion slot is provided in the front surface of the player apparatus as described above, so that there is a disadvantage in that the indicator cannot achieve its indicating functions sufficiently.

Figure 14:
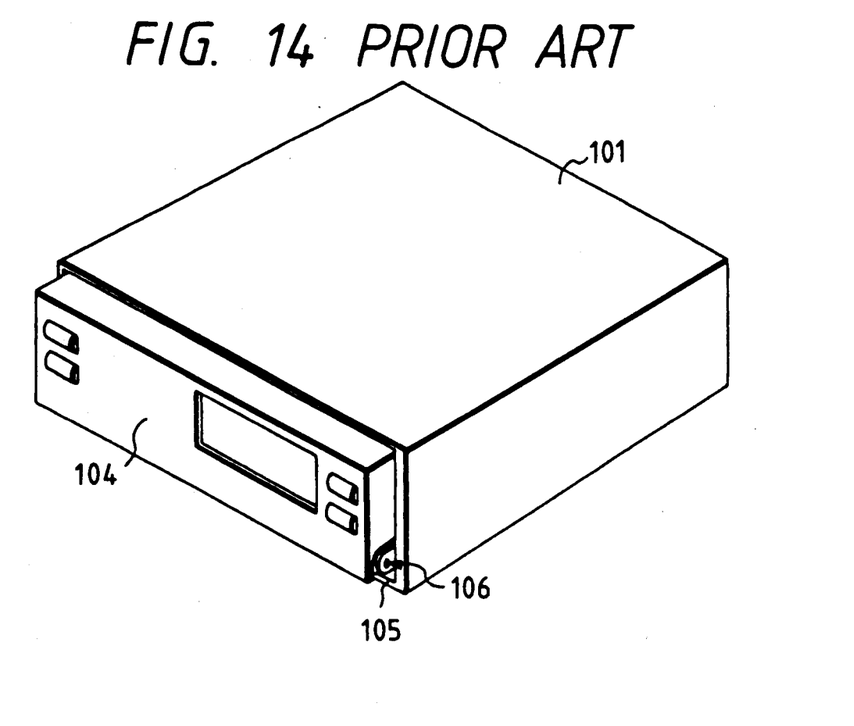
FIGS. 14 and 15 are perspective views of an example of the conventional recording medium player apparatus.
Figure 15:
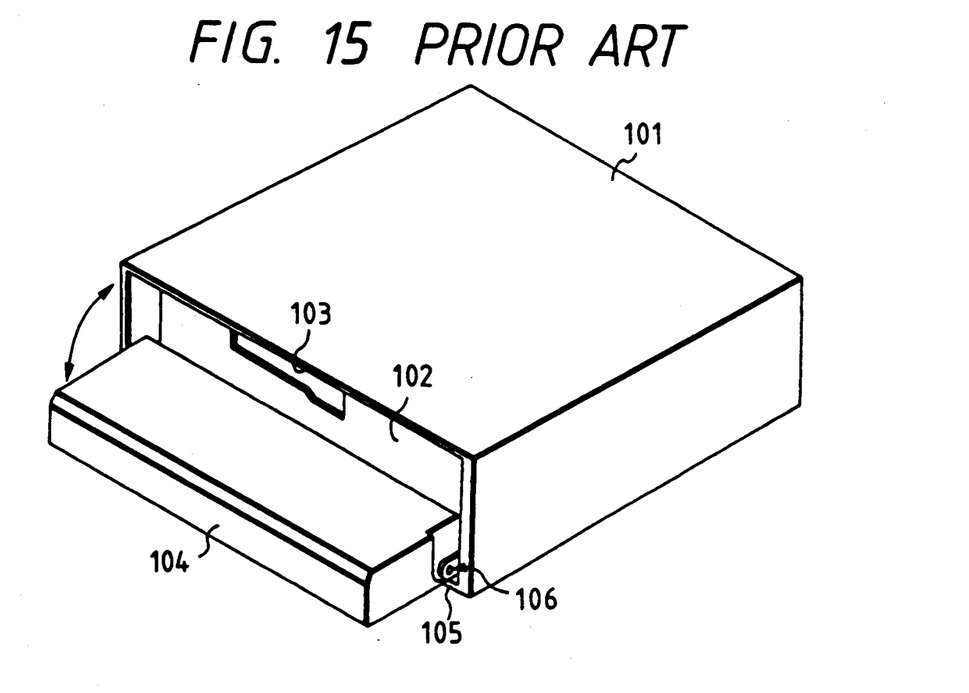

In order to solve such a problem, as shown in FIGS. 14 and 15, it is possible to provide a pivotally mounted open/close body 104 in front of a recording medium insertion slot 103 formed in a front panel portion 102 of a housing 101. Further, an operation portion for controlling the operation of the play means, an indicator portion for indicating the operating conditions of various functions, etc., are provided not only on the front panel portion 102, but on the open/close body 104. Thus, the positive enlargement of the area of the operation portion or indicator portion through the use of the open/close body makes it possible to cope with the expansion of the operation portion and the increase in the contents of the control information and the play information to be indicated.

In the case of providing such a pivotal open/close body 104, in order to prevent the pivotal open/close body 104 from interfering with an edge portion of the front panel portion, a hinge mechanism 106 is provided for pivotally attaching the open/close body 104 onto the housing in the vicinity of the front surface of the open/close body 104. In such a configuration, however, the hinge mechanism 106 is always exposed so as to detract from the overall appearance of the recording medium player apparatus.

SUMMARY OF THE INVENTION

It is therefore an object of the present invention to provide a recording medium player apparatus which comprises an open/close body for covering and uncovering a recording medium insertion slot; the body having such an operation portion and being pleasing in appearance.

The recording medium player apparatus according to the present invention comprises an open/close body provided so as to cover or not cover a recording medium insertion slot formed in a front surface portion of a housing and provided with an operation portion for controlling the operation of a play means. The apparatus further comprises a support member pivotally provided on the housing for pivotally supporting at a free end portion thereof the open/close body, a first driving means for pivotally moving the support member, and a second driving means for pivotally moving the open/close body relative to the support member.

DETAILED DESCRIPTION OF PREFERRED EMBODIMENT

Referring to the accompanying drawings, as an embodiment of the present invention, a cassette deck will be described hereunder.

Figure 1:
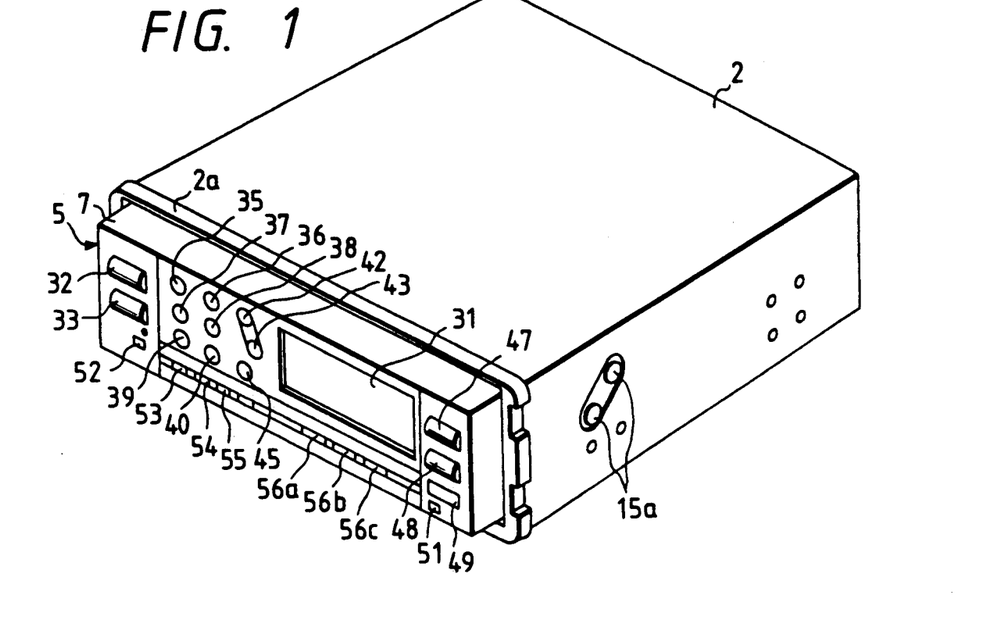
FIG. 1 is a perspective view of the cassette deck according to an embodiment of the present invention.
Figure 2:
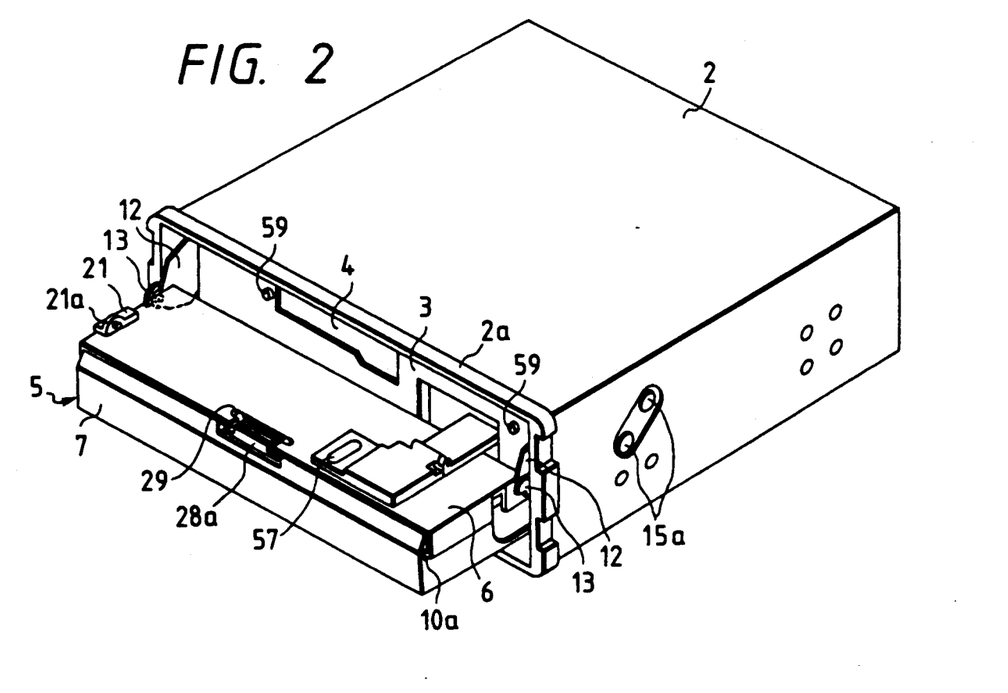
FIG. 2 is a perspective view showing the state where the open/close body of the cassette deck of FIG. 1 is opened.

As shown in FIGS. 1 and 2, for example, the cassette deck has a housing including a cabinet portion 2 as a main part which is removably inserted and loaded into a holding space through an insertion slot of a holding box fixed on a dashboard (not shown) of a car. Further, a front surface portion of the cabinet portion 2, that is, a front panel portion 3 is exposed outside of the holding space. The cassette deck is provided with an open/close body 5 for openably covering a cassette tape insertion slot 4 (see FIG. 2) formed in the front panel portion 3 for insertion of a cassette tape (not shown) acting as a recording medium.

Figure 3:
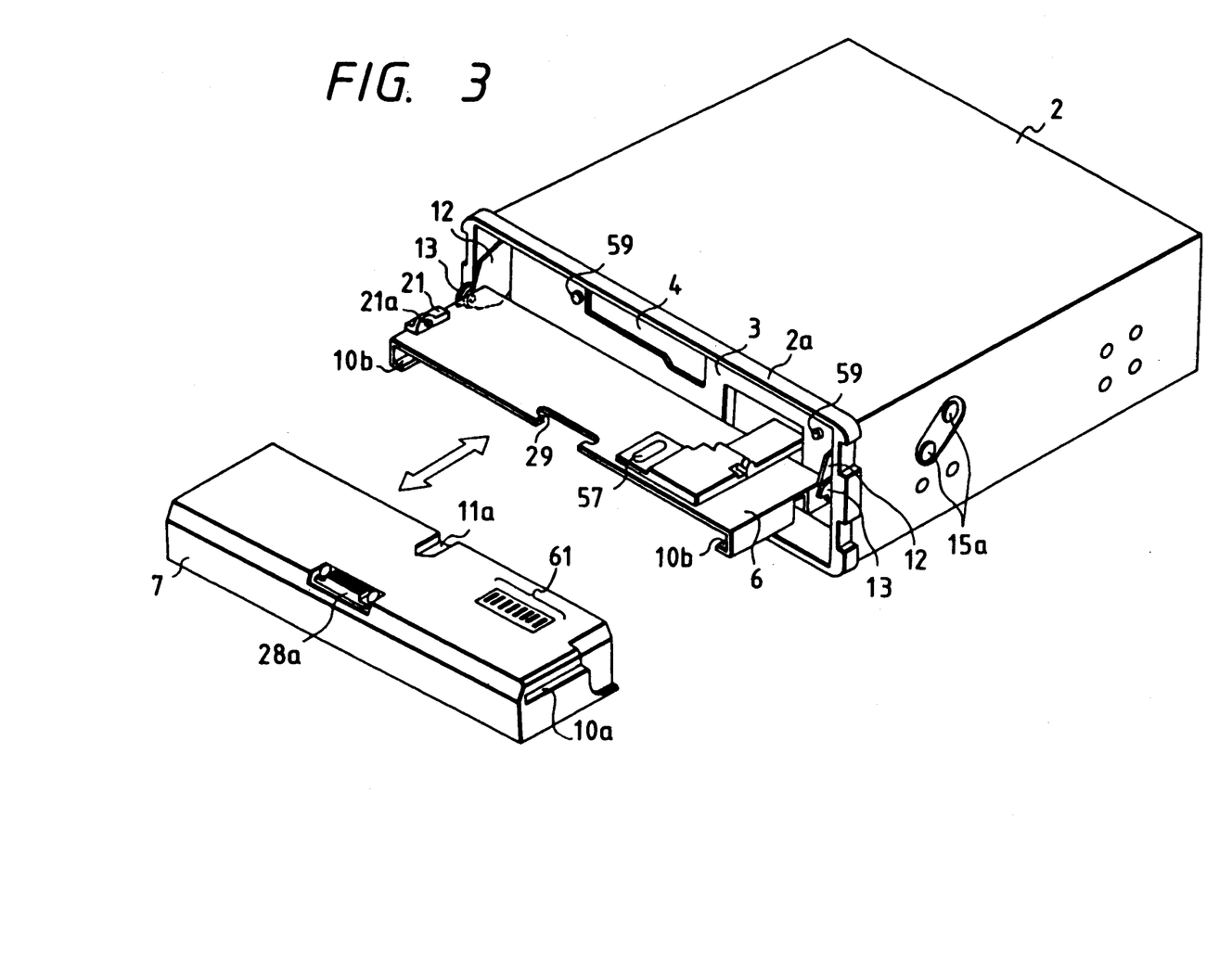
FIG. 3 a perspective view showing the state where the outer cover portion including the operation portion is drawn out of the cassette deck of FIG. 1.
Figure 4:
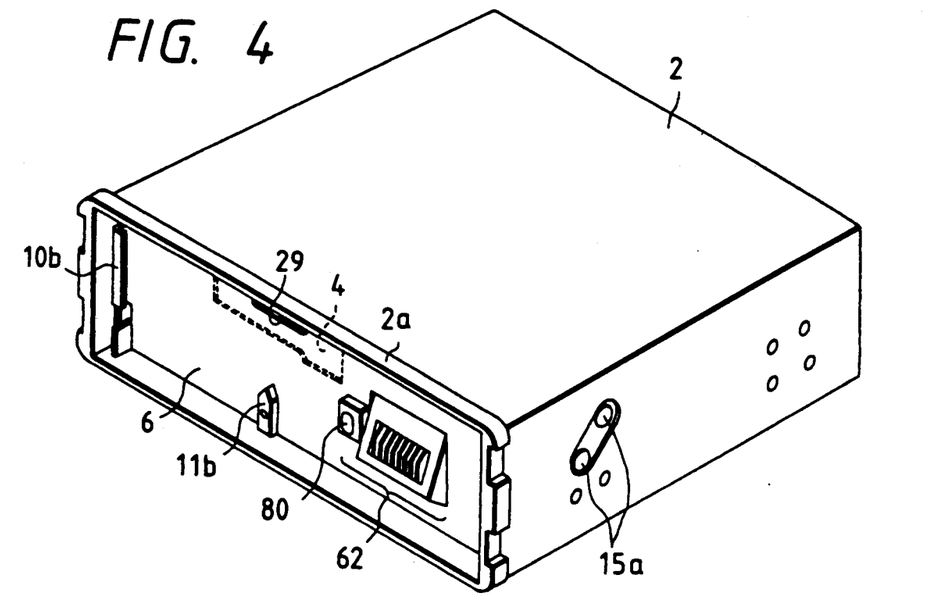
FIG. 4 is a perspective view showing the state after the outer cover portion including the operation portion has been drawn out of the cassette deck of FIG. 1.

As shown also in FIGS. 3 and 4, the open/close body 5 is constituted by an inner cover portion 6 and an outer cover portion 7. The inner cover portion 6 is made of a steel plate or the like and is generally formed like a rectangular plate so that the inner cover portion 6 can cover substantially the whole surface of the front panel portion 3 including the cassette tape insertion slot 4.

On the other hand, the outer cover portion 7 is constituted by a hollow rectangular-parallelepiped housing made of resin or the like and is removably attached to the inner cover portion 6. More specifically, a slot 10a is formed in each of the longitudinally opposite ends of the outer cover portion 7 so that a U-shaped channel end portion 10b formed at each of the longitudinally opposite ends of the inner cover portion 6 slidably engages with the corresponding slot 10a. Further, an engagement recess portion 11a having a tip head portion is formed in the rear surface of the outer cover portion 7 and an engagement projecting portion 11b having a tip head portion is formed on the front surface portion of the inner cover portion 6 (see FIG. 4) so that the engagement projection portion 11b can be fitted into the engagement recess portion 11a.

When the outer cover portion 7 is mounted on the inner cover portion 6, the engagement recess portion 11a and engagement projecting portion 11b are engaged with each other so that the movement of the outer cover portion 7 in the longitudinal direction, that is, in the left/right direction, relative to the inner cover portion 6 is limited. Further, as shown in FIG. 1, when the inner cover portion 6 is in a closed position where the inner cover portion 6 closes the cassette tape insertion slot 4, the upward movement of the outer cover portion 7 attached to the inner cover portion 6 is limited by an edge portion 2a of the front panel portion 3 projected forward further than the main surface of the front panel portion 3 so that the outer cover portion 7 is prevented from coming off from the inner cover portion 6.

Figure 5:
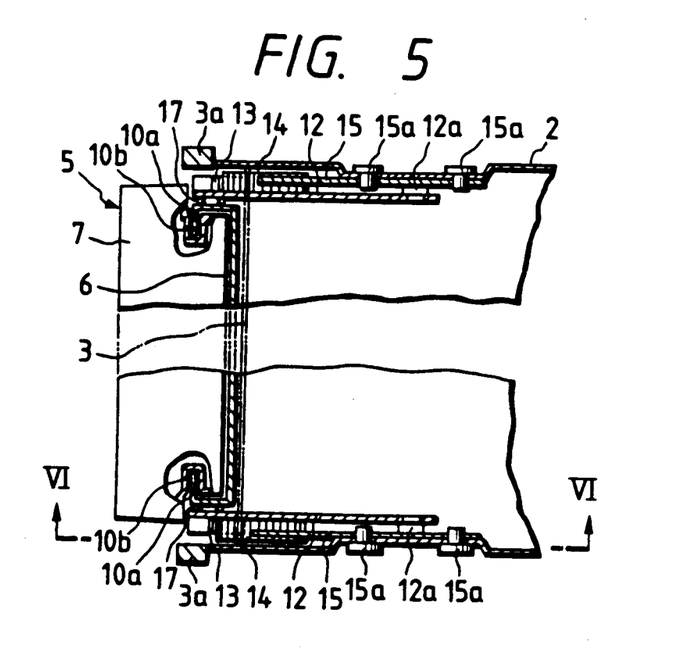
FIGS. 5-9, 10a, 10b, and 11 are enlarged views of part of the cassette deck shown in FIGS. 1-4.
Figure 6:
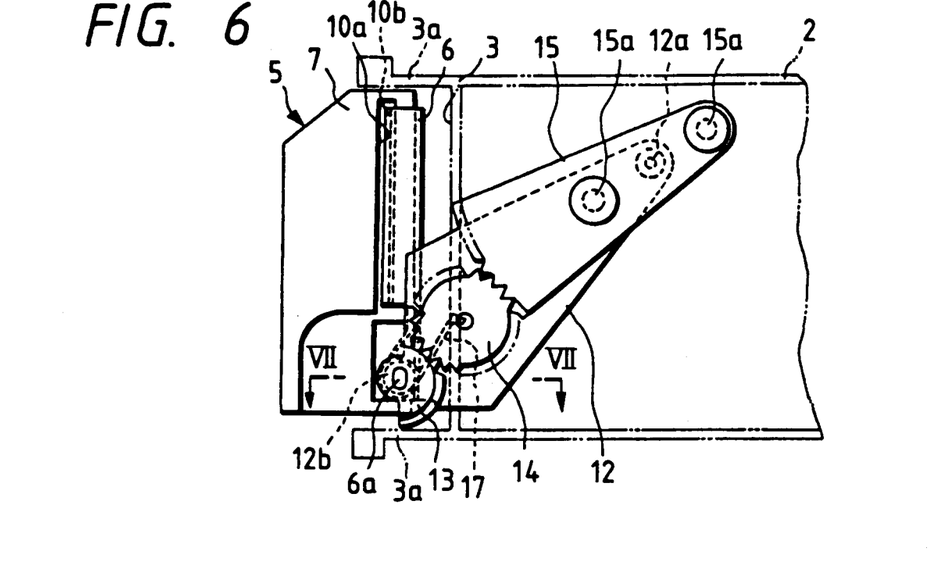

As shown in FIGS. 5 and 6, the inner cover portion 6 is pivotally supported by a pair of support members 12 at the left and right side portions of and at one transverse edge portion (e.g., the lower edge portion) of the inner cover portion 6. The support members 12 are pivotally attached through pins 12a on inner surfaces of left and right opposite side wall portions of the housing 2 so as to pivotally support the inner cover portion 6 by the free end portions thereof respectively. The pivotal movement of each of the inner cover portion 6 and the support members 12 is performed within a plane perpendicular to the main surface of the front panel portion 3 of the housing 2.

Figure 7:
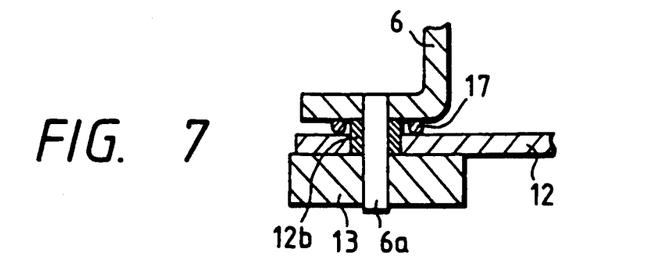
Figure 8:
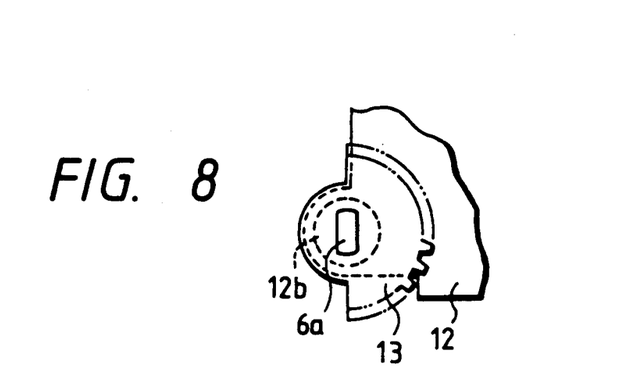

The state of the attachment of the inner cover portion 6 to the support members 12 will now be described in detail. As shown in FIGS. 7 and 8, cylindrical bosses 12b are pivotally provided at the respective free ends of the support members 12 so that pins 6a projectingly provided at side end portions of the inner cover portion 6 are fitted into the bosses 12b. As particularly apparent in FIG. 8, the pins 6a are in a fixed state relative to the inner cover portion 6. As shown in FIG. 7, the pins 6a are longer than the bosses 12b so that the pins 6a project from the bosses 12b, and the first gear members, that is, fan-like gears 13 are fixed to the projected portions of the pins 6a, respectively. That is, the fan-like gears 13 are arranged so that the rotary central axes thereof coincide with the center axis of the pivotal movement of the inner cover portion 6. In other words, the fan-like gears 13 are provided so as to be rotatable relative to the support members 12 while being fixed relative to the inner cover portion 6.

Second gear members, that is, gears 14 are provided on the support members 12 at the free end portions thereof so as to mesh with the fan-like gears 13, respectively. The gears 14 mesh with third gear members, that is, other fan-like gears 15 fixed to the cabinet portion 2, through a pair of pins 15a, respectively (see FIGS. 5 and 6).

As shown in FIGS. 5-8, spring members 17 are provided for urging the inner cover portion 6 to its open position.

In the above-mentioned configuration, the support members 12 are pivoted clockwise from the position illustrated in FIG. 6 by the urging force of the respective spring members 17 so that the open/close body 5 constituted by the inner cover portion 6 and the outer cover portion 7 is pivoted to its open position. In the opened state of the open/close body 5, if the open/close body 5 is manually, arcuately pushed toward the cabinet portion 2, the support members 12 are returned to the position shown in FIG. 6 against the urging force of the respective spring members 17 so that the open/close body 5 is returned to the closed position as shown in FIG. 6.

The above-mentioned spring members 17 constitute a first driving means for pivoting the support members 12. This first driving means, the fan-like gears 13 and 15, and the gears 14 constitute a second driving means for pivoting the open/close body 5 relative to the support members 12 in synchronism with the pivotal movement of the support members 12. That is, the first driving means is utilized as part of the second driving means.

Figure 9:
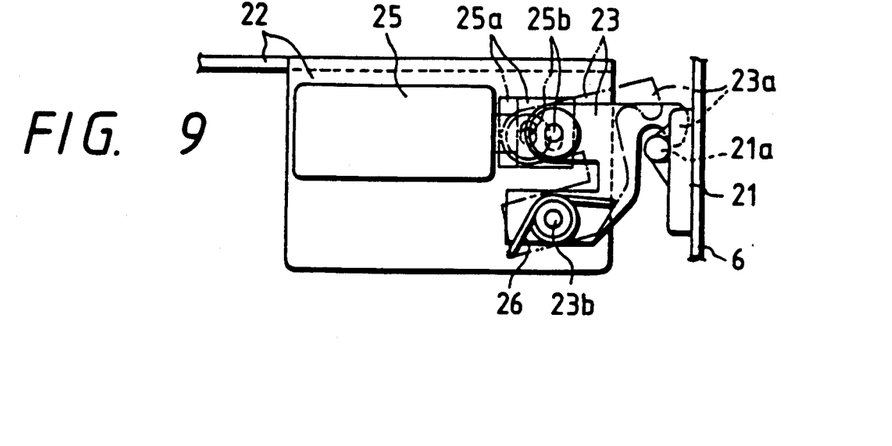

As shown in FIGS. 2, 3 and 9, an engagement/stopper member 21 having a pin 21a is fixedly provided on the left rear surface of the inner cover portion 6. As shown in FIG. 9, an engagement/stopper lever 23 is swingably attached through a support pin 23b onto a fixed chassis 22 provided inside the cabinet portion 2 so that the engagement/stopper lever 23 can engage with the pin 21a of the engagement/stopper member 21 by means of a pawl portion 23a provided at a free end of the engagement/stopper lever 23. A solenoid plunger 25 is provided under the engagement/stopper lever 23 so that a rod 25a of the solenoid plunger 25 is connected to the engagement/stopper lever 23 through a connection pin 25b. In such a configuration, the solenoid plunger 25 attracts the rod 25a so that the engagement/stopper lever 23 swings to the position as shown by solid lines in FIG. 9 to engage with the engagement/stopper member 21, and when the power supply to the solenoid plunger 25 is cut off the engagement/stopper lever 23 is swung to the position as shown by two-dotted chain lines in FIG. 9 by the urging force of a coil spring 26 to thereby be released from the state of engagement with the engagement/stopper member 21. Thus, the inner cover portion 6 is put into the open state by the biasing force of the spring members 17.

The engagement/stopper member 21, the engagement/stopper lever 23, and the solenoid plunger 25 constitute an inner cover portion engagement/stopper means, that is, a first engagement/stopper means for locking the inner cover portion 6 to the cabinet portion 2. By the provision of this first engagement/stopper means, as shown in FIG. 1, the open/close body 5 constituted by the inner cover portion 6 and the outer cover portion 7 is rigidly fixed to the cabinet portion 2 so that the open/close body 5 is never opened/closed even if a considerably large force is applied thereto.

As shown in FIGS. 2, 3, 10(a) and 10(b), an engagement/stopper plate 28 having a plate spring fixed thereto in a cantilever relation is secured to a rear surface portion of the outer cover portion 7 and an engagement/stopper protrusion 28a is attached to a free end portion of the engagement/stopper plate 28. On the other hand, a pawl-like opening 29 is formed in the inner cover portion 6 so that the engagement/stopper protrusion 28a can engage with the opening 29. The engagement/stopper plate 28 and the opening 29 constitute a second engagement/stopper means for locking the outer cover portion 7 to the cabinet portion 2, that is, for locking the outer cover portion 7 to the inner cover portion 6 which is fixed to the cabinet portion 2 by the above-mentioned first engagement/stopper means. By the provision of this second engagement/stopper means, play of the outer cover portion 7 is prevented.

Figure 11:
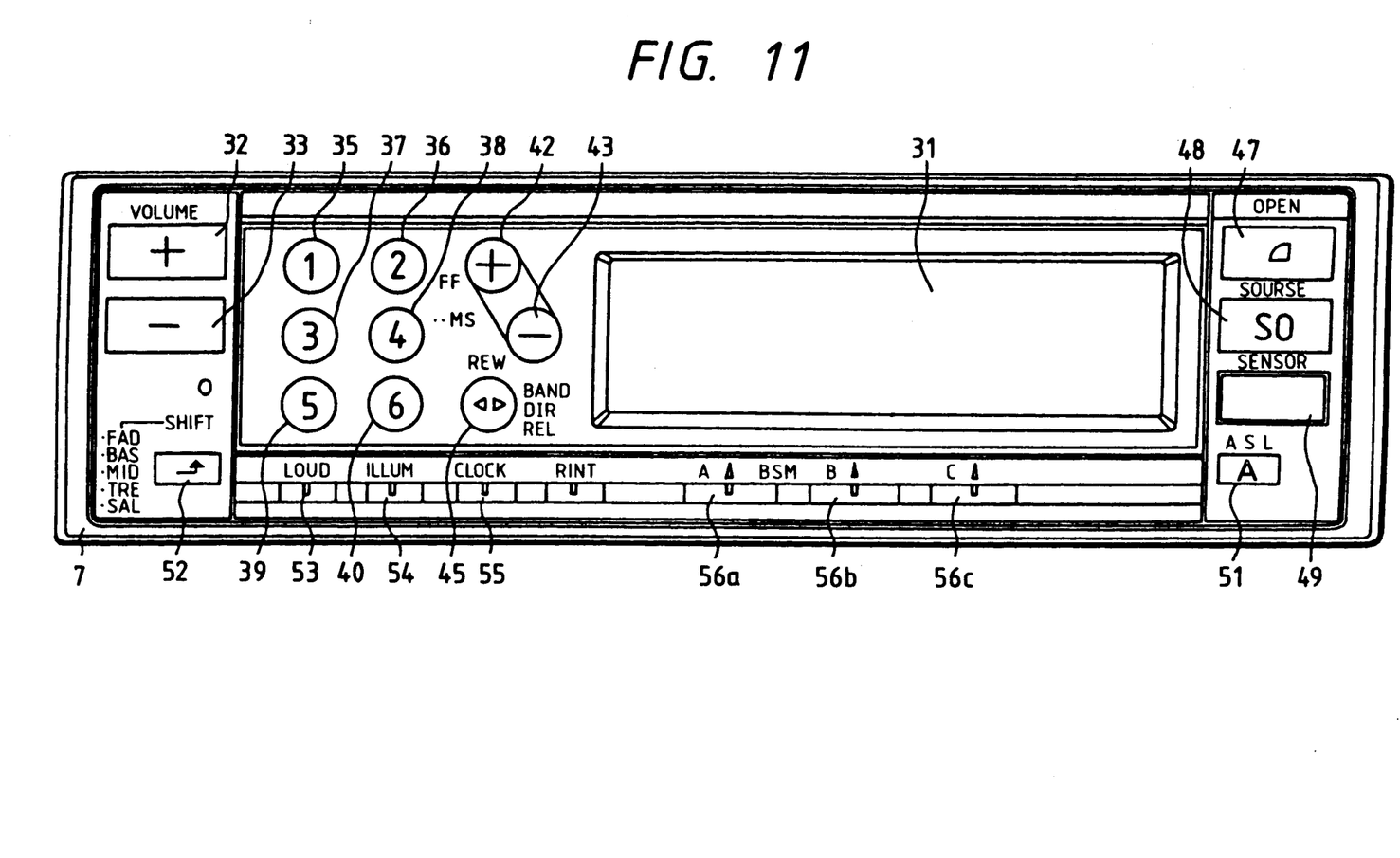

As shown in FIGS. 1 and 11, an operation portion including various operation switches for controlling operation of a cassette tape player and so on provided in the cabinet portion 2, and an indicator portion 31 are provided on the front surface portion of the outer cover portion 7. Further, an indicator driving circuit for driving the indicator portion is provided inside the outer cover portion 7.

As apparent particularly in FIG. 11, electronic sound volume control switches 32 and 33 are provided in the operation portion on the outer cover portion 7. The switches 32 and 33 function to make the sound volume louder or softer while they are pushed down, respectively. Further, control switches 35–40 which are used for music jump-selecting operation are provided so as to produce commands for indicating the number of pieces of music to be jumped to a target one ahead (or behind) of a current one. On the side of the control switches 35–40, a fast-feed switch 42, a rewinding switch 43, and a switch 45 for changing over the tape running direction in auto-reverse operation are provided.

A door open switch 47 is provided for opening the above-mentioned open/close body 5 and a source change-over switch 48 disposed under the door open switch 47 is provided for selecting which one of the cassette deck, the tuner, and the digital audio disc player, of the operation portion is to be used. A sensor 49 is provided under the source change-over switch 48 for receiving a signal from a remote controller for remote controlling the operation portion. An automatic sound levelizing switch 51 is such that, if this switch is pushed, the sound volume is automatically made softer during the tim of car stoppage, while the sound volume is made louder during the time of car running when noises become loud.

A shift switch 52 is provided under the sound volume control switches 32 and 33, and a loudness switch 53, a clock switch 54, an illumination change-over switch 55, etc., are arranged in order on the side of the shift switch 52. When the illumination change-over switch is pushed, the illumination color of the indicator portion 31 is changed into, for example, green and red. Under the indicator portion 31, there are provided change-over switches 56a–56c for selecting which one of the functions of the cassette deck, the tuner, and the digital audio disc player, the indicator portion 31 should perform indication.

On the other hand, in the indicator portion 31 provided on the outer cover portion 7 together with the above-mentioned operation portion, indication is made with respect to the tape play time, the operation mode, the distinction of current playing side between the sides A and B, and so on, in use of the cassette deck. Indication is made with respect to the program selection information, the operation mode, etc. during use of the tuner, while indication is made with respect to the disc play elapsed time, the operation mode, etc. during use of the digital audio disc player. Further, as described above, an indicator driving circuit for driving the indicator portion 31 is provided inside the outer cover portion 7.

As shown in FIGS. 2 and 3, an eject switch 57 for ejecting a cassette tape is disposed outside the cassette deck on the rear surface of the inner cover portion 6. Further, door closure detection switches 59 are provided on the front panel portion 3 so that the switches 59 detect the open/close of the inner cover portion 6 through engagement with the inner cover portion 6.

The transmission/reception of signals between the operation portion provided on the outer cover portion 7 and the CPU (control circuit) provided in the cabinet portion 2 is performed through connection between the terminal groups 61 and 62 correspondingly provided on the rear surface portion of the outer cover portion 7 and the front surface portion of the inner cover portion 6, respectively (see FIGS. 3 and 4). Through the terminal groups 61 and 62, power is supplied to the outer cover portion 7 from the cabinet portion 2 side. The terminal groups 61 and 62 are connected to each other by mounting the outer cover portion 7 onto the inner cover portion 6 and disconnected from each other by removing the outer cover portion 7 from the inner cover portion 6. As described above, since the indicator driving circuit for driving the indicator portion 31 on the outer cover portion 7 is not provided on the cabinet portion 2 side but provided in the outer cover portion 7, the terminal groups of 61 and 62 are reduced in number.

Figure 12:
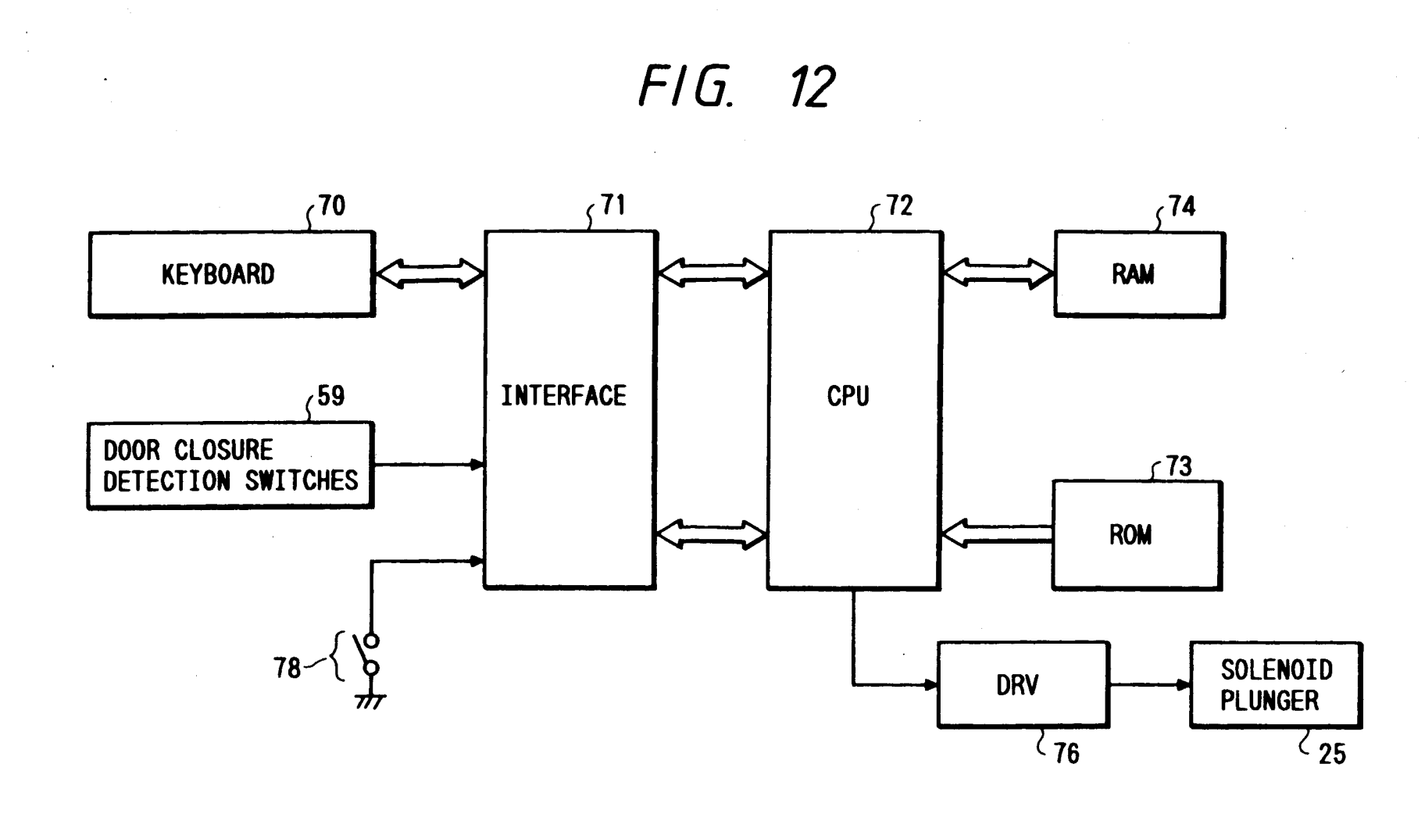
FIG. 12 is a block diagram showing the control system for controlling the operation of the cassette deck shown in FIGS. 1-11.
Figure 13:
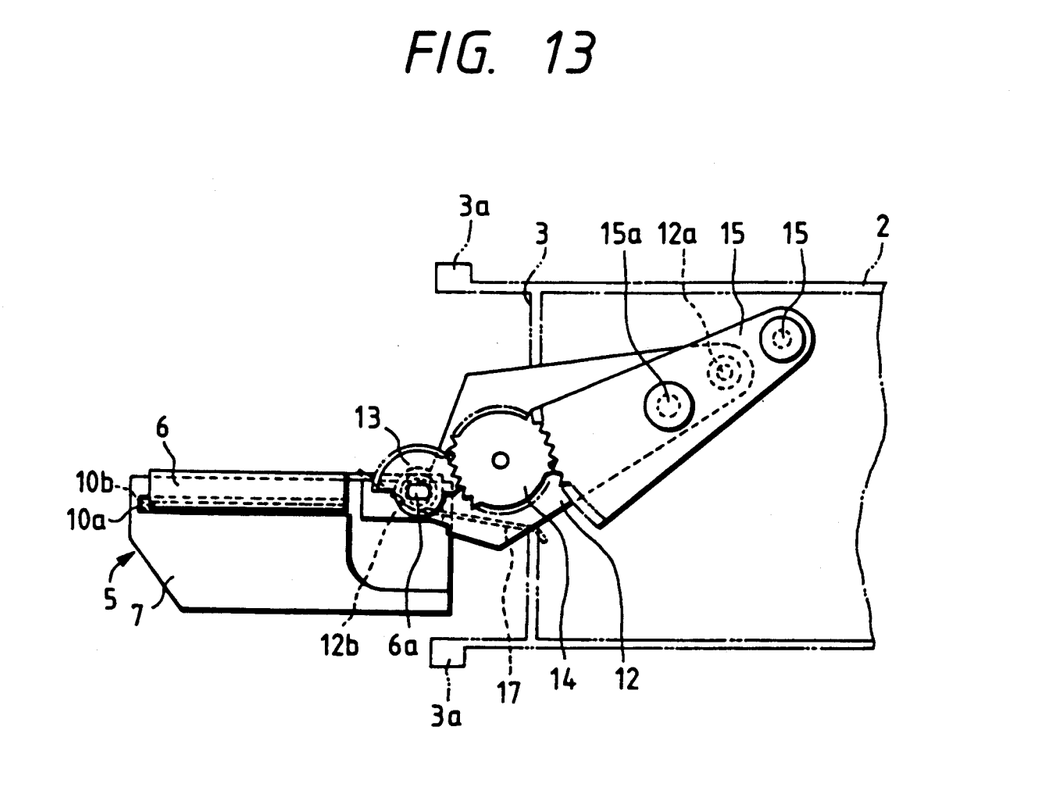
FIG. 13 is an explanatory view for explaining the operation of the cassette deck shown in FIGS. 1-11.

Next, referring to FIGS. 12 and 13, description will now be made with respect to the open/close operation of the open/close body 5 and the attachment/removal operation of the outer cover portion 7 in the configuration as described above.

When the open/close body 5 in the closed position shown in FIG. 1 is to be opened, the door open switch 47 among the switches of a keyboard provided on the outer cover portion 7 is pushed. As shown in FIG. 12, a signal generated from a keyboard 70 is transferred to a CPU (control circuit) 72 in the cabinet portion 2 through an interface 71 so that the CPU 72 supplies the solenoid plunger 25 with a driving signal through a driving circuit (DRV) 76 in accordance with an operation program stored in a ROM (read only memory) 73 while using a RAM (random access memory) 74. When the door open switch 47 is pushed, the CPU 72 first cuts off the supply of power to the solenoid plunger 25 so as to release the locked state between the engagement/stopper member 21 and the engagement/stopper lever 23 to thereby enable the inner cover portion 6 to swing. Then, the open/close body 5 constituted by the inner cover portion 6 and outer cover portion 7 is pivotally moved by the urging force of the spring members 17 toward the open position shown in FIGS. 2 and 13.

Figure 10A:
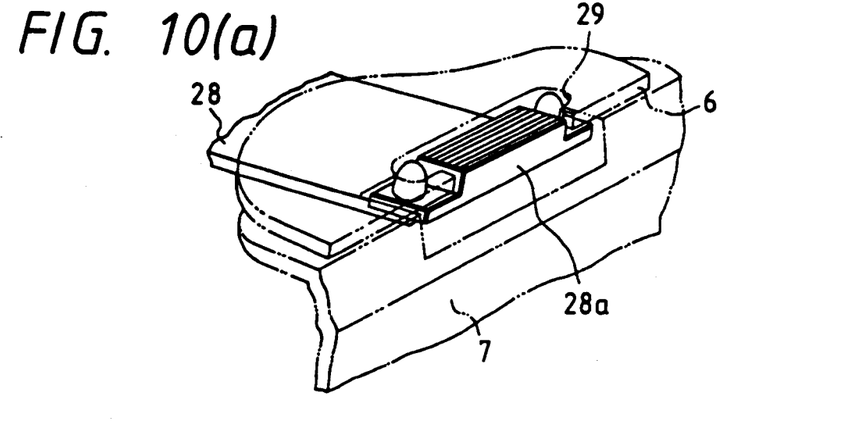
Figure 10B:
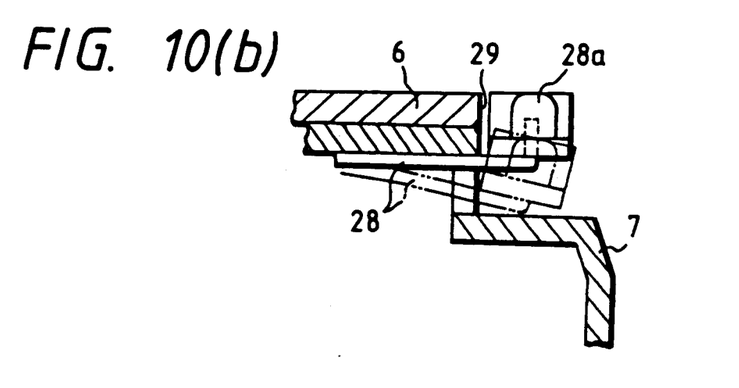

Thus, the open/close body 5 reaches the open position shown in FIG. 2. In this state, the eject switch 57 on the rear surface of the inner cover portion 6 can be pushed so that the cassette tape (not shown) is ejected outside through the cassette tape insertion slot 4 of the front panel portion 3 so as to be withdrawn by the operator. When the operator parks the car in which the cassette deck is mounted so as to leave the car, the operator pushes down the engagement/stopper protrusion 28a of the outer cover portion 7 so that the engagement/stopper plate 28 of the outer cover portion 7 is bent so as to release the locked state of the outer cover portion 7 to the inner cover portion 6 as shown in FIG. 10(b). Thus, the operator can draw out the outer cover portion 7 from the inner cover portion 6 to carry the outer cover portion 7 with him or her.

When the operator comes back to the car and intends to attach the outer cover portion 7 to the inner cover portion 6 again, it will suffice for the operator to push another door open switch 80 arranged on the front surface of the inner cover portion 6 as shown in FIG. 4. By depression of the door open switch 80, the inner cover portion 6 opens in the same operation as described above so that the operator can mount the outer cover portion 7 to the inner cover portion 6.

In the above embodiment, the open/close body 5 is divided into the inner cover portion 6 which is pivotal to the front panel portion 3 so as to open/close the cassette tape insertion slot 4, and the outer cover portion 7 which is arranged so as to be removably mounted on the inner cover portion 6 and includes the operation portion for controlling the operation of the play means provided within the cabinet portion 2. The present invention is not limited to such a configuration but is applicable to a modified configuration in which the outer cover portion 7 is pivotally attached to the front panel portion 3 with the inner cover portion 6 omitted.

As described in detail above, the recording medium player apparatus according to the present invention comprises an open/close body which is provided so as to openably/closably cover a recording medium insertion slot formed in the front surface portion of a housing and which is provided with an operation portion for controlling the operation of a play means, and further comprises a support member for pivotally supporting at its free end the open/close body, a first driving means for pivotally moving the support member, and a second driving means for pivotally moving the open/close body relative to the support member.

That is, the apparatus is configured so that the open/close body is largely separated from the edge portion of the front panel portion of the housing when the open/close body is in the open position where the open/close body opens the recording medium insertion slot.

Because of such a configuration, the pivotal portion of the open/close body can be disposed in the vicinity of the rear surface portion of the open/close body, whereby when the open/close body is in the closed position where the open/close body closes the recording medium insertion slot the above-mentioned pivotal portion is covered by the front panel portion so as not to be visible to thereby obtain a sense of beauty in appearance.

What is claimed is:
1. A recording medium player apparatus comprising a housing enclosing a play means and having an insertion slot formed at a front surface portion thereof for insertion of a recording medium carrying an information signal;
an open/close body disposed so as to openably cover said insertion slot and provided with an operation portion for controlling the operation of said play means; and
further comprising a support member pivotally disposed on said housing for pivotally supporting at a free end portion thereof said open/close body;
a first driving means for pivotally moving said support member; and
a second driving means for pivotally moving said open/close body relative to said support member.

2. A recording medium player apparatus according to claim 1, wherein said first and second driving means are comprised by:
a first gear member fixed on said open/close body so that a center axis of said first gear member coincides with a pivotal center axis of said open/close body;
a second gear member rotatably disposed on said support member so as to mesh with said first gear member;
a third gear member fixedly provided on said housing so as to mesh with said second gear member; and a driving force application means for applying driving force to said support member.

3. A recording medium player apparatus according to claim 1 or 2, wherein said open/close body includes an inner cover portion pivotally disposed on said housing for openably closing said insertion slot; and
an outer cover portion including said operation portion and removably disposed on said inner cover portion.

4. A recording medium player apparatus according to claim 2, wherein said driving force application means is a spring.

5. A recording medium player apparatus according to claim 3, further comprising a first engagement/stopper means for releasably locking said inner cover portion to said housing.

6. A recording medium player apparatus according to claim 5, further comprising a second engagement/stopper means for releasably locking said outer cover portion to said inner cover portion.

7. A recording medium player apparatus according to claim 5, wherein said first engagement/stopper means includes an engagement/stopper member having a pin fixedly disposed on a rear surface of said inner cover portion, an engagement/stopper lever swingably attached to a fixed chassis disposed on said housing, and a solenoid plunger connected to said engagement/stopper lever, whereby upon energization said solenoid plunger causes said engagement/stopper lever to swing so as to engage with said pin.

* * * * *